United States Patent [19]

Kuwaki et al.

[11] 4,448,346
[45] May 15, 1984

[54] CONTROL SYSTEM FOR AUTOMATIC VENDING MACHINES

[75] Inventors: Masami Kuwaki; Youichi Hatada; Satoru Umino, all of Kanagawa, Japan

[73] Assignee: Fuji Electric Co., Ltd., Kanagawa, Japan

[21] Appl. No.: 375,627

[22] Filed: May 6, 1982

[51] Int. Cl.³ ............................ F23N 5/20; B67D 5/62
[52] U.S. Cl. .................................... 236/46 R; 62/158; 222/146 R
[58] Field of Search ...................... 236/46 R; 165/12; 222/146 R, 638; 62/158

Primary Examiner—William E. Wayner
Attorney, Agent, or Firm—Sughrue, Mion, Zinn, Macpeak and Seas

[57] ABSTRACT

A control system for an automatic vending machine functions to operate a refrigerator, for example, continuously during a first mode after a power interruption or restocking occurs, and then switches to a non-continuous mode which may be controlled thermostaticly or by cyclicly switching the refrigerator on and off at selected intervals of time. Also, a timer may be set to turn off the refrigerator and other accessories such as lights altogether during selected times of day.

5 Claims, 2 Drawing Figures

CONTROL SYSTEM FOR AUTOMATIC VENDING MACHINES

BACKGROUND OF THE INVENTION

This invention concerns a temperature control system for an automatic vending machine.

Conventional temperature control systems for an automatic vending machine for cooling commercial articles or substances to a predetermined temperature and discharging them on customer demand switch a refrigerant compressor motor ON and OFF in response to detection signals from temperature adjusters disposed in the storage section of the machine. Only a small temperature change triggers the ON-OFF operation due to the performance of the temperature adjusters in such systems, however, and as a result the motor compressor is frequently started and stopped which increases the electric power loss.

Further, in conventional control systems, the motor compressor is also switched ON and OFF during the night when the commercial articles are not vended, which results in unnecessary cooling and attendant electric power consumption.

Furthermore, the vending machine is often connected to a commercial power source by a receptacle which may become unplugged inadvertently and thereby render the power source voltage unstable. If the power source is restored after interruption, or when the commercial articles are restocked it is necessary to adequately cool or heat the articles to a predetermined temperature.

SUMMARY OF THE INVENTION

This invention has been accomplished in order to overcome the foregoing various problems, and the object thereof is to provide a control system capable of economizing electrical power usage effectively, as well as dispensing commercial articles at a controlled perdetermined temperature.

DETAILED DESCRIPTION OF THE PREFERRED EMBODIMENTS

Figure 1:
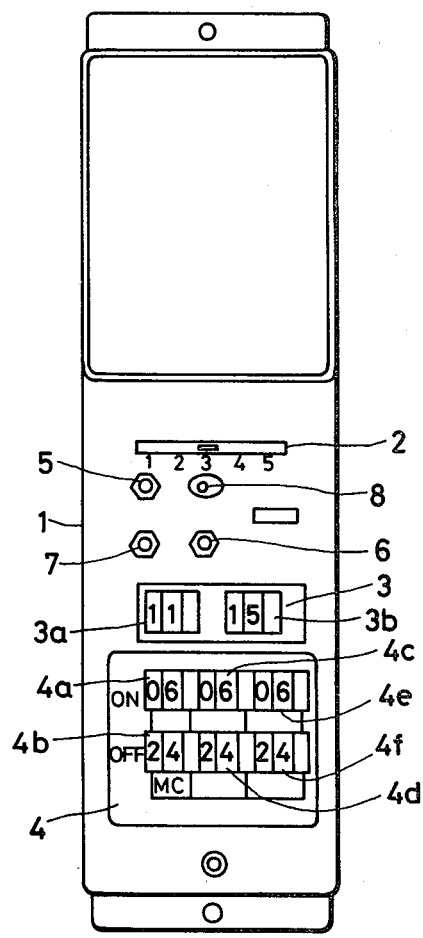
FIG. 1 is a plan view of a control panel for use with one embodiment of this invention.

FIG. 1 shows a control panel for use with an automatic vending machine to which this invention is applied, wherein reference numeral 1 represents a control panel main body and reference numeral 2 represents a power economization mode control switch for setting positive ON-OFF times of the refrigerator and the heater in the automatic vending machine, the switch being adapted to be switchable in 5 steps. For example, the refrigerator or heater will be operated in each of the five steps for the times as shown in Table 1:

TABLE 1

| Step | Refrigerator ON/OFF periods | Heater ON/OFF periods |
| --- | --- | --- |
| 1 | 5/25 | 25/10 |
| 2 | 10/25 | 25/20 |
| 3 | 15/25 | 15/20 |
| 4 | 20/25 | 10/20 |
| 5 | 25/25 | 5/20 |

In FIG. 1 is also shown a present time setting switch 3 using digital switches in which hours and minutes are set on sides 3a and 3b, respectively.

Reference numeral 4 represents an operation time setting switch for setting the operation times of one day by hourly units, comprising digital switches respectively consisting of a start time setting switch 4a for the refrigerator, an end time setting switch 4b for the refrigerator, a start time setting switch 4c for the heater, an end time setting switch 4d for the heater, a lighting time setting switch 4e for the fluorescent lamp for illuminating the display panel or the like and an extinguishing time setting switch 4f for the fluorescent lamp.

In the drawing are further shown a push button switch 5 operated upon the setting of the present time, a switch 6 operated upon loading or restocking the machine, a push button switch 7 for terminating the timer function set by the time setting switch 4 and a pilot lamp 8 which lights up upon installation of the automatic vending machine or after a power supply interruption.

Figure 2:
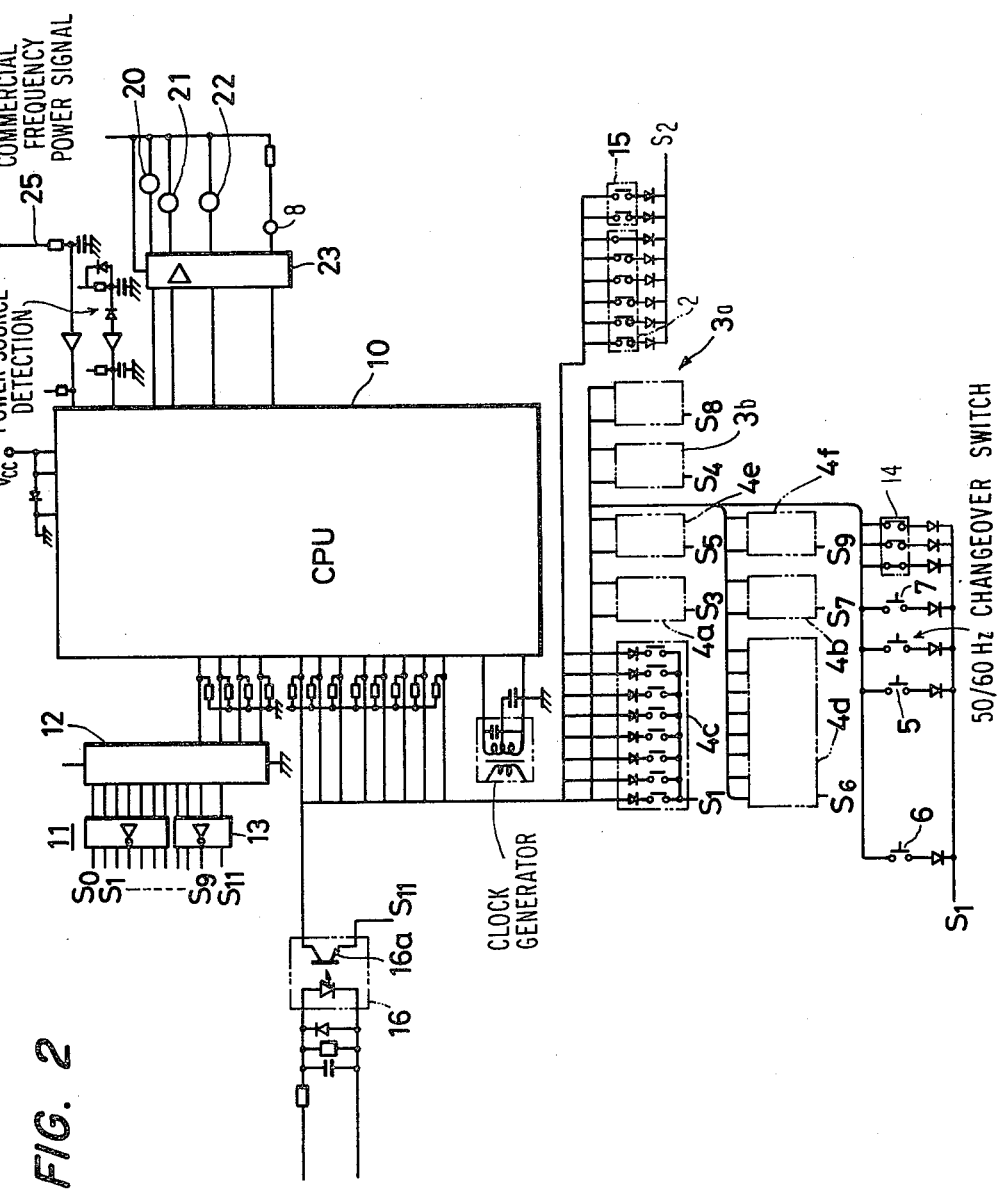
FIG. 2 is a block circuit diagram of one embodiment of this invention.

FIG. 2 shows the main part of the control circuit for use in the automatic vending machine according to this invention, wherein a CPU (central processing unit) 10 using a microcomputer stores therein a program for executing known operations required for the automatic vending machine, such as the calculation of the inputted sum of coins, the dispensing of the articles or the like, and a control program or instructions and data for executing various controls used in this invention.

An input selection circuit 11 generates strobe pulses $S_0$–$S_{11}$ that repeat at a predetermined timing, the pulses generated from the CPU 10 by way of a decoder 12 and a switching circuit (transistor array) 13. These stobe signals $S_0$–$S_{11}$ are variously applied to the time setting switches 4a–4f and also to each of the push button switches 5, 6, and 7, a fluorescent lamp mode setting switch 14, a positive ON-OFF mode instruction control switch 15 and the phototransistor 16a in a circuit 16 actuated by dispensing signals from the automatic vending machine main body.

There are also shown an ON-OFF relay 20 for heating, an ON-OFF relay 21 for the motor of the compressor in the refrigerator, an ON-OFF relay 22 for the fluorescent lamp and a driver circuit 23 for amplifying the output of the CPU 10 to thereby drive the relays.

Pulses synchronized with the frequency of an AC power source are applied to an input terminal 25 as clock signals.

Further, each of the time setting switches 3, 4a–4f has, as typically represented by 4c, contacts corresponding to binarized decimal values of 1, 2, 4, 8, and signals indicative of time are inputted to the CPU 10 by way of the contacts.

In the automatic vending machine as described above, upon setting the present time setting switch 3 to the present time, the time data are read into the clock (not shown) in the CPU 10 and the clock operation is started.

In the case where articles in the automatic vending machine are to be dispensed while cooled to a predetermined temperature for a period of from, say, 9 AM to 12

PM, if the start time setting switch 4a for the refrigerator is set to "06" (to allow for initial cooling) and the end time setting switch 4b is set to "24", the contacts corresponding to these values are turned ON, through which timing signals are applied to the CPU 10.

The time setting switches 4c, 4d for the heater and the time setting switches 4e, 4f for the fluorescent lamp can also be set to desired times.

Pull-down mode

For instance, where the automatic vending machine is operated for the first time after the installation thereof, if the hook-up of the power source is detected, ON signals are obtained from a power source detection circuit to light the lamp 8. Upon turning the loading push button switch 6 to ON after setting (loading) a predetermined number of articles in the storage section in the automatic vending machine, the ON signal and the loading signal are logically ANDed within the CPU 10 to indicate the initial stage of installation, whereby the relay 21 turns ON to initiate cooling. Then, the motor for the refrigerator is continously operated until the temperature for the articles arrives at a predetermined temperature and the articles are also cooled to the predetermined temperature, that is, a so-called pull-down operation is performed. The period for the pull-down operation has been determined experimentally and the data therefore are stored within the CPU 10.

When pull-down has been completed, the relay 21 turns OFF. The pull-down mode is executed just after installation as mentioned above, as well as just after the recovery of the power source after a power supply interruption or just after restocking the articles. Thereafter, if no particular times are set, temperature control by way of the usual thermostatic ON-OFF control is carried out by temperature sensors provided in the automatic vending machine where the refrigerator is turned ON if the articles are above a predetermined temperature and turned OFF if they are below the predetermined temperature.

Timer mode

The timer mode is attained by setting the time setting switches 4a, 4e, to, for example, "6" and switches 4b, 4f to "24".

Then, when the actual time arrives at 6 AM, the automatic vending machine is brought into the operation mode by the coincidence between the signals set by the switches 4a, 4e and the signals from the clock in the CPU 10 (or the clock in the time setting switches 3), whereby the relay 22 turns ON to light up the fluorescent lamp and, if the articles have not yet been cooled to the predetermined temperature, the relay 21 also turns ON to operate the refrigerator to thereby cool the commercial articles.

Then, when the actual time becomes 12 PM (24 o'clock), the relays 21 and 22 are turned OFF by the coincidence between the signals from the time setting switches 4a, 4e and the signals from the clock, whereby the operation of the automatic vending machine is stopped, the refrigerator is stopped, no temperature control is applied for the commercial articles and the fluorescent lamp is extinguished.

Positive ON-OFF mode

If the power economization mode switch 2 is set to a given position, for example "3", a signal representative of "3" is applied to the CPU 10.

Then, by setting the timer mode and turning the positive ON-OFF switch 15 to ON, 15 min of ON time and a 25 min OFF period (see the data in Table 1) are respectively read out from the memory in the CPU 10, whereby the relay 21 repeats a 15 min ON and 25 min OFF cycle, so that the motor of the compressor in the refrigerator operates intermittently in accordance with the above cycle. The electric power can thus be economized.

The ON-OFF periods in the above intermittent operation can be varied by changing the setting of the power economization mode switch, as indicated in Table 1, above.

Further, in an automatic vending machine adapted to carry out zone cooling in which the vicinity of the articles to be next dispensed is primarily cooled, the intermittent operation cycle may be amended in such a way that if articles have been dispensed during the ON period of the relay 21 and, thus, during refrigeration, the ON period is extended for a certain time and, if articles have been dispensed during the OFF period, the OFF period is shortened, so that the articles to be next dispensed are cooled to the predetermined temperature. Whether the articles have been dispensed can be judged in this case from the signals applied from the phototransistor 16a in the photocoupler 16 to the CPU 10, by driving the photocoupler with vending signals issued from a vending counter provided in the automatic vending machine.

Return to usual mode

By turning the timer interruption switch 7 to ON, the positive ON-OFF control is interrupted and the mode is switched to the usual control mode.

If all of the commercial articles have been sold out, the operation of the refrigerator is stopped.

Although this invention has been explained with respect to a cooling control system, the invention can also be applied in various other cases such as where the commercial articles are heated using a heater or the like, or where both heating and cooling are conducted depending upon the kind of articles, in one vending machine.

As has been explained specifically above, according to this invention, since the refrigerator or the like is operated continuously after the initial installation of the machine, during recovery from a power interruption or upon the restocking of the machine, the articles can be rapidly set to a predetermined temperature even in an automatic vending machine whose power source is relatively unstable and, since the control mode may be changed automatically to the positive ON-OFF control after the above, power consumption can be economized. Further, since the refrigerator or the like may be stopped by means of a timer during time zones such as during the night where it is less utilized, power consumption can be further reduced.

What is claimed is:

1. A control system for an automatic vending machine adapted to control the temperature of thermal loads placed in the vending machine, comprising: time setting means, a loading switch actuated after the setting of a load in the automatic vending machine, a control switch means for selectively setting periods of positive operation of a refrigerator or heater and control circuit means responsive to signals from said time setting means, said loading switch and said control switch means, for placing said refrigerator or heater in an ON state continuously for a predetermined period of time just after the installation of the automatic vending machine, upon recovery of the power source after a power supply interruption and upon operation of said loading switch, and for thereafter carrying out positive ON-OFF control based on a time set by said control switch means and stopping the operation of said refrigerator or heater during a time outside of a period set by said time setting means.

2. A control system as claimed in claim 1, said control switch means comprising a period setting switch having a plurality of settings, each varying an on-time/off-time ratio of said refrigerator or heater.

3. A control system as claimed in claim 1, said time setting means comprising a plurality of switch means for manually settting times for turning at least said refrigerator or heater on and off.

4. A control system as claimed in claim 3, said vending machine further including a display, said time setting means including switch means for setting and on-time and an off-time of said display.

5. A control system as claimed in claim 1, said predetermined period comprising a time required to bring a temperature of a storage area of said vending machine, and said thermal load, to a predetermined temperature.

* * * * *